United States Patent
Waitkus et al.

(10) Patent No.: US 10,746,338 B2
(45) Date of Patent: Aug. 18, 2020

(54) CONDUIT BOOT WITH BUSHING

(71) Applicant: United Technologies Corporation, Farmington, CT (US)

(72) Inventors: Christopher Waitkus, New York, NY (US); Curtis J. Ruckey, Windsor Locks, CT (US)

(73) Assignee: United Technologies Corporation, Farmington, CT (US)

( * ) Notice: Subject to any disclaimer, the term of this patent is extended or adjusted under 35 U.S.C. 154(b) by 99 days.

(21) Appl. No.: 16/119,320

(22) Filed: Aug. 31, 2018

(65) Prior Publication Data

US 2020/0072402 A1 Mar. 5, 2020

(51) Int. Cl.
| | |
|---|---|
| *F16L 41/08* | (2006.01) |
| *F01D 25/24* | (2006.01) |
| *F16B 5/02* | (2006.01) |
| *F16B 19/02* | (2006.01) |
| *F16B 21/12* | (2006.01) |

(52) U.S. Cl.
CPC .......... *F16L 41/088* (2013.01); *F01D 25/243* (2013.01); *F16B 5/0225* (2013.01); *F16B 19/02* (2013.01); *F16B 21/12* (2013.01); *F16B 2200/506* (2018.08)

(58) Field of Classification Search
CPC ......... F16L 41/088; F16L 41/08; F16L 41/02; F01D 25/243; F01D 25/265; F16B 2200/506; F16B 5/02; F16B 5/0004; F16B 25/00; F16B 39/00; F16B 19/02; F16B 21/09; F16B 21/10; F16B 21/06; F16B 21/12

USPC ............................................ 277/606
See application file for complete search history.

(56) References Cited

U.S. PATENT DOCUMENTS

| | | | | |
|---|---|---|---|---|
| 1,216,508 A | * | 2/1917 | Spade | F16D 3/42 464/125 |
| 2,550,138 A | | 8/1951 | Crawford | |
| 3,137,237 A | * | 6/1964 | Zagar | F16J 15/36 417/423.11 |
| 4,241,944 A | * | 12/1980 | Clark | F16L 33/28 285/229 |
| 4,819,919 A | * | 4/1989 | Taylor | F16F 9/38 188/321.11 |

(Continued)

OTHER PUBLICATIONS

Yardley Products Corp., website: http://www.yardleyproducts.com/product-tag/molded-in/, Retrieved Aug. 27, 2018. 4 Pages.

(Continued)

*Primary Examiner* — Nathan Cumar
(74) *Attorney, Agent, or Firm* — Kinney & Lange, P.A.

(57) ABSTRACT

An assembly for sealing an interface between a conduit and a case includes a boot and a bushing. The boot includes a tube and rubber flange. The rubber flange extends generally radially outward from the tube. The rubber flange includes an opening passing through a portion of the rubber flange. The bushing is disposed in the rubber flange and includes a tubular body, a channel, and a lip. The tubular body is disposed in the opening of the rubber flange. The channel extends through a center of the body. The lip is generally flat and extends radially outward from the tubular body. The lip is in contact and engages with the rubber flange so as to compress the rubber flange against the case.

17 Claims, 7 Drawing Sheets

(56) References Cited

U.S. PATENT DOCUMENTS

| | | | | |
|---|---|---|---|---|
| 5,318,480 | A * | 6/1994 | Essi | F16J 3/048 |
| | | | | 277/636 |
| 5,961,155 | A | 10/1999 | Youngs | |
| 6,612,620 | B1 * | 9/2003 | Nordstrom | F16L 5/06 |
| | | | | 285/139.1 |
| 8,814,462 | B2 | 8/2014 | Care | |
| 9,073,620 | B2 | 7/2015 | Kondo | |
| 9,212,680 | B2 | 12/2015 | Schneider | |
| 2010/0044971 | A1 * | 2/2010 | Henry | B65D 88/54 |
| | | | | 277/606 |

OTHER PUBLICATIONS

Extended European Search Report for EP Application No. 19191327.6, dated Jan. 28, 2020, 8 pages.

* cited by examiner

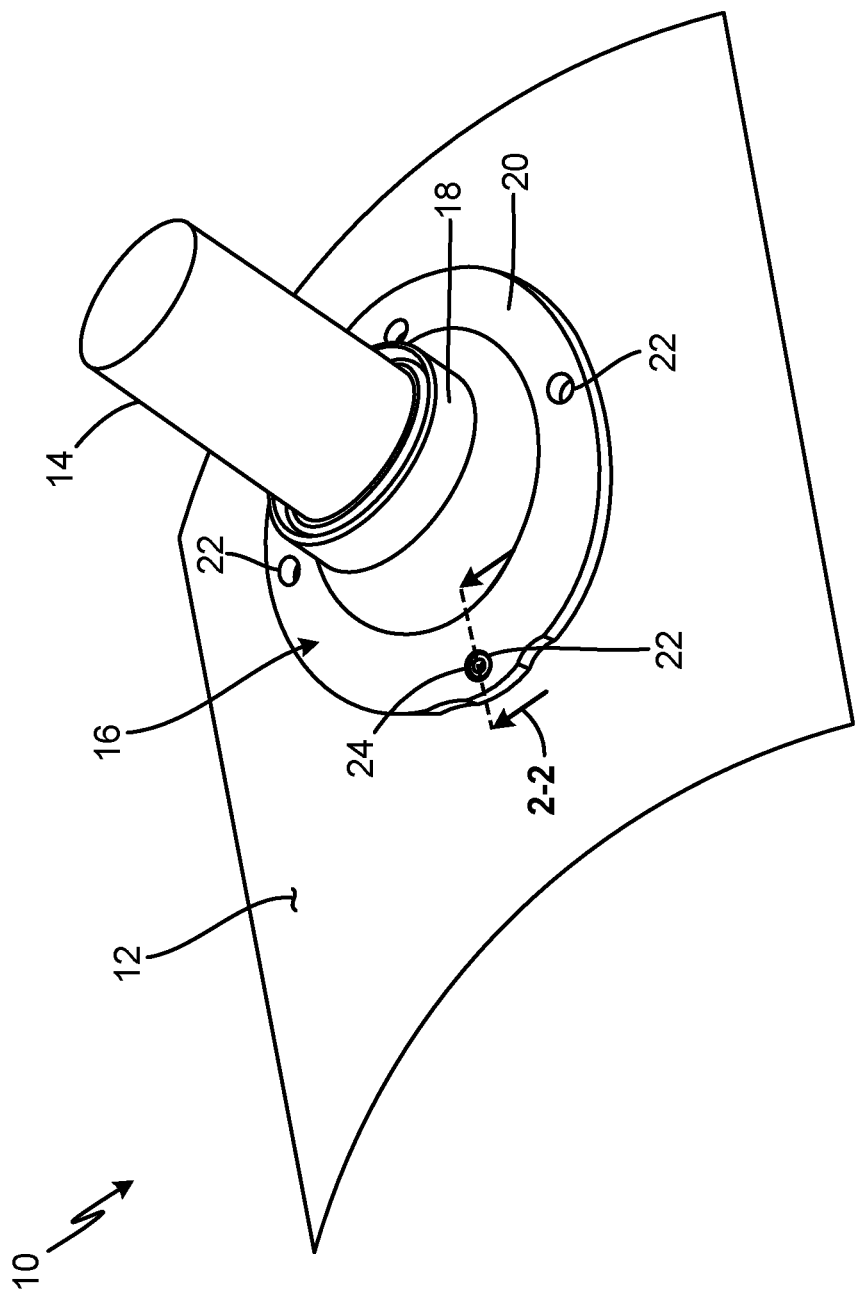

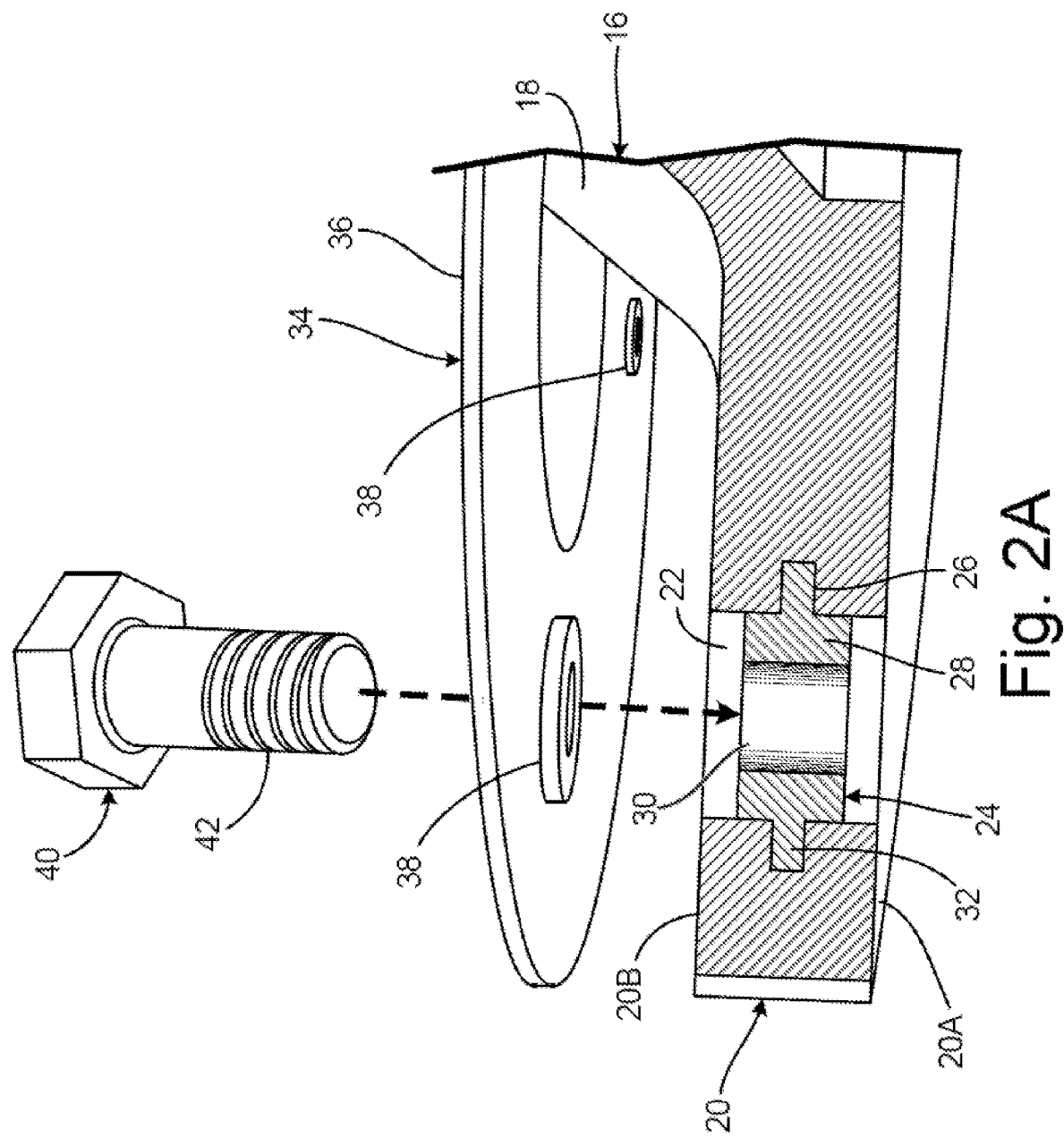

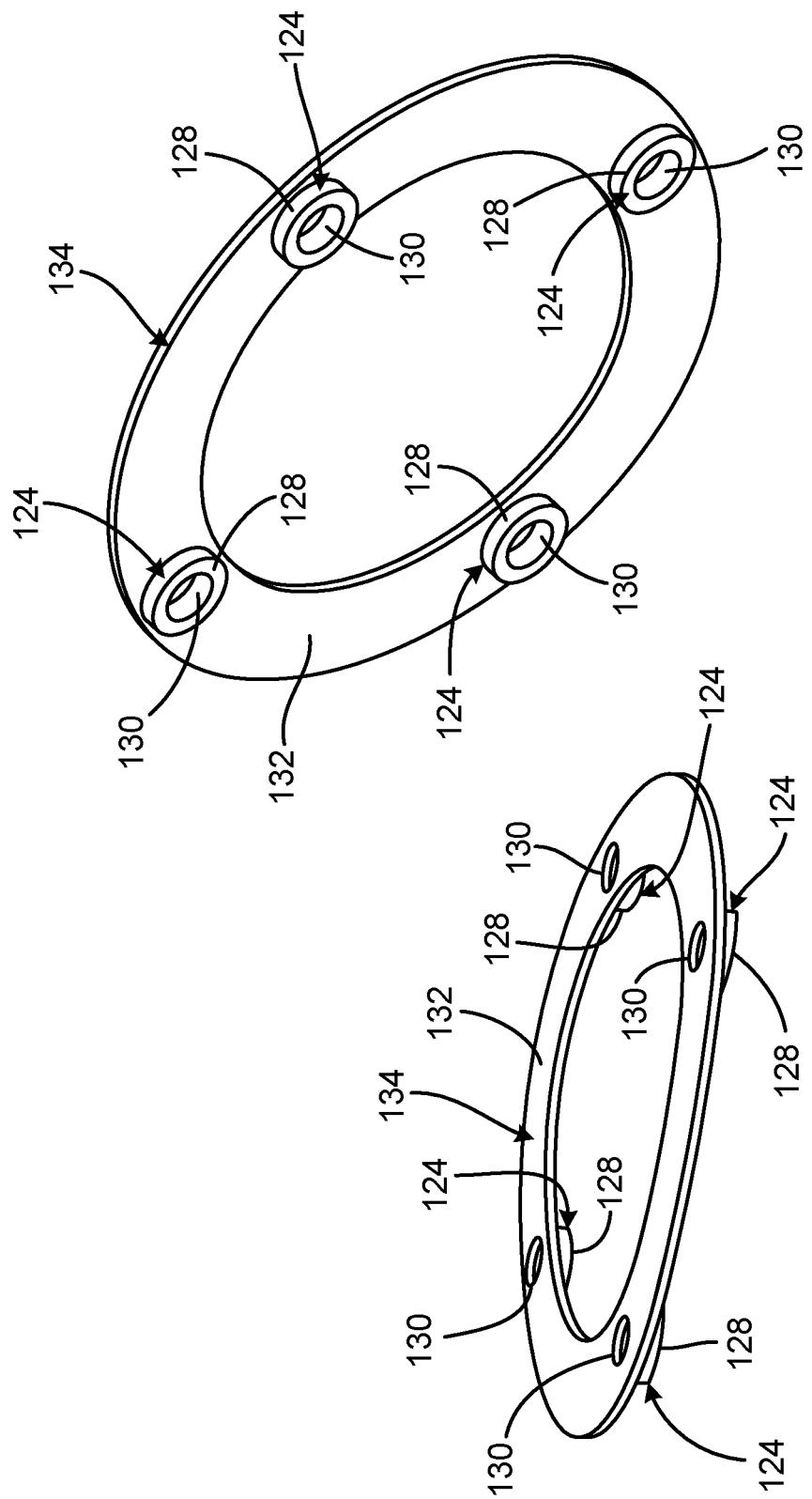

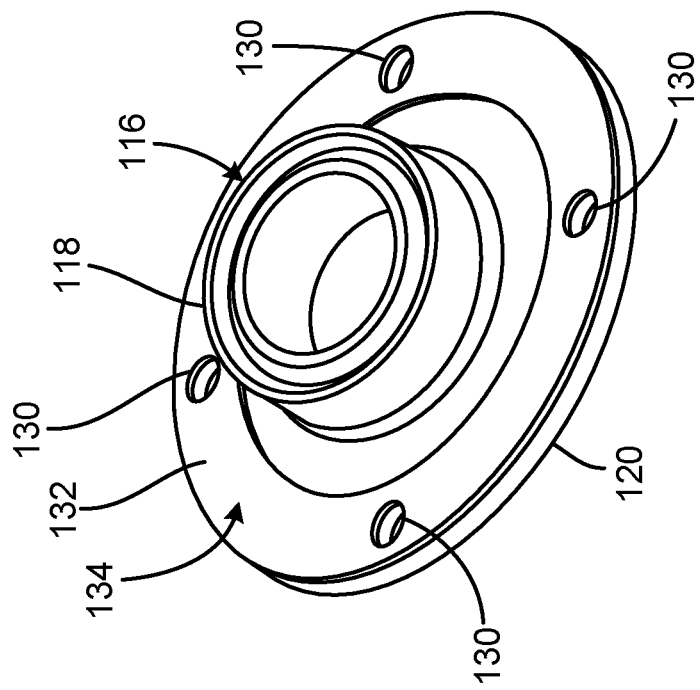
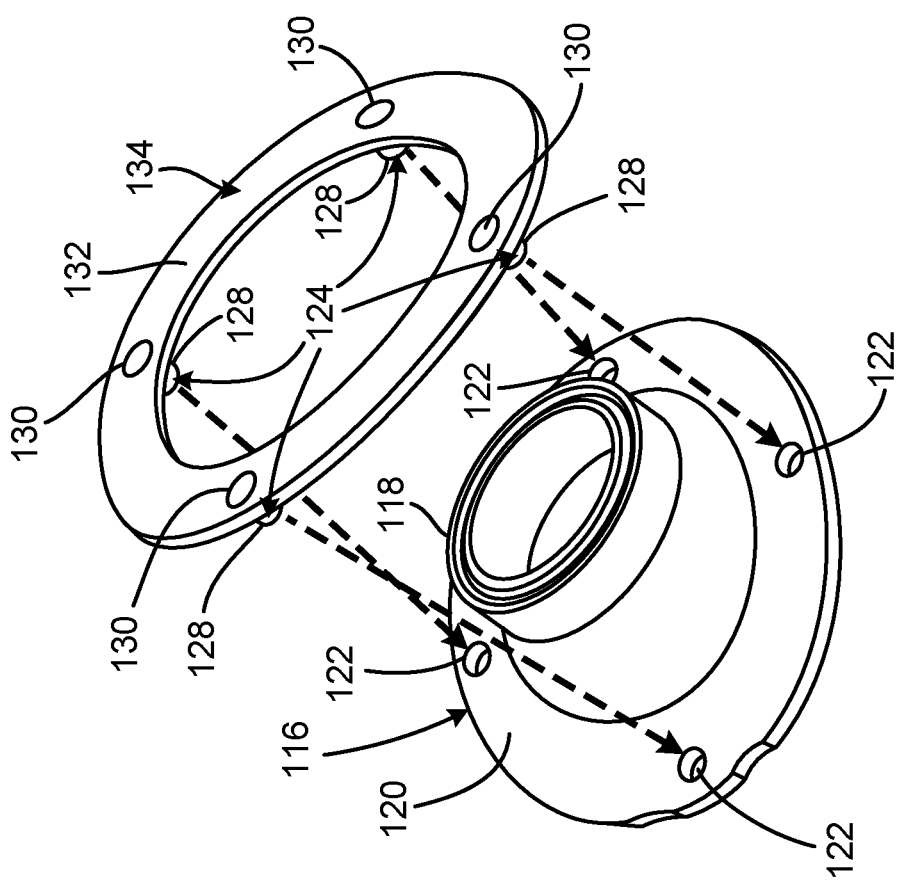
Fig. 5B
Fig. 5A

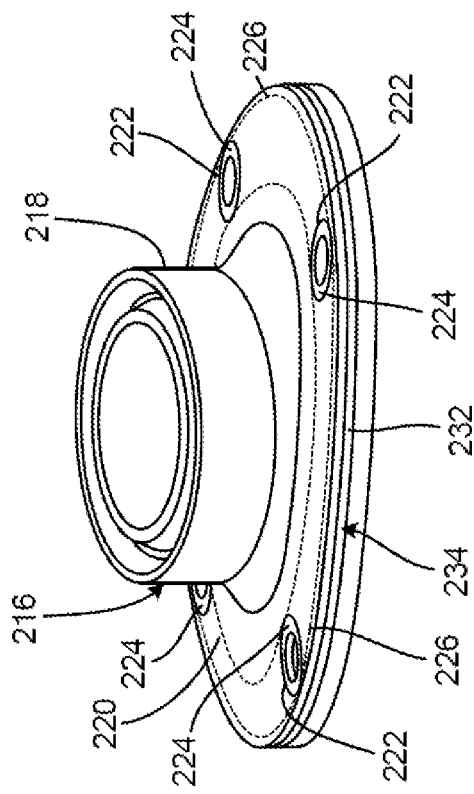
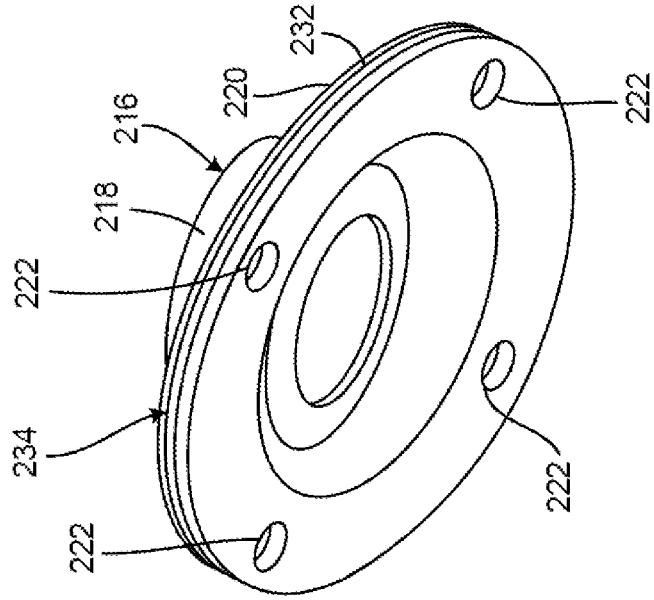
Fig. 6B
Fig. 6A

CONDUIT BOOT WITH BUSHING

BACKGROUND

The present disclosure generally relates to bushings. In particular, the present disclosure relates to bushing structures for use with a conduit boot.

In some turbine engine applications, a boot is used to form a sealing interface between a conduit and a case. The boot can be attached to the case via mechanical attachment, often by way of a bolt stack. Applying standard torque to hardware containing rubber elements within a bolt stack, such as a flange of the conduit boot, presents the risk of doing permanent damage to the rubber section of the stack because of compressibility and varying hardness levels of the rubber. When rubber of a low hardness is used in a bolt stack, standard torque values can over-compress the rubber beyond a design intent.

SUMMARY

An assembly for sealing an interface between a conduit and a case includes a boot and a bushing. The boot includes a tube and rubber flange. The rubber flange extends generally radially outward from the first end of the tube. The rubber flange includes an opening passing through a portion of the rubber flange. The rubber flange includes a first major face and a second major face. The bushing is disposed in the rubber flange and includes a tubular body, a channel, and a lip. The tubular body is disposed in the opening of the rubber flange. The channel extends through a center of the body. The lip is generally flat and extends radially outward from the tubular body. The lip is in contact and engages with the rubber flange so as to compress the rubber flange against the case.

A method of attaching a boot to a case includes passing a fastener through a portion of a boot assembly. The boot assembly includes a boot and a bushing. The boot includes a tube and a rubber flange. The rubber flange extends generally radially outward from the first end of the tube and includes an opening and a ring-shaped slot. The rubber flange includes a first major face and a second major face. The opening passes through a portion of the rubber flange that the fastener passes through. The ring-shaped slot is connected to and extends around a portion of the opening. The bushing is disposed in the rubber flange and includes a tubular body, a channel, and a lip. The tubular body is disposed in the opening of the rubber flange. The channel extends through a center of the body that the fastener is passed through. The lip is generally flat and extends radially outward from the tubular body. The lip is in contact with a portion of the rubber flange of the boot. The fastener is attachably engaged with the case. A compressive force is applied to the rubber flange with the fastener. The rubber flange of the boot is pressed against the case with the lip of the bushing. A sealing interface is formed between a first major face of the rubber flange and a surface of the case.

An assembly for sealing an interface between a conduit and a case in an aircraft includes a boot, a bushing, a retaining ring, and a fastener. The boot includes a tube, a rubber flange with first and second major faces, and a slot. The conduit passes through a portion of the tube and a fluidic seal is formed between the conduit and the tube of the boot. The rubber flange extends generally radially outward from the first end of the tube and includes an opening passing through a portion of the rubber flange. The slot is disposed in a portion of the rubber flange. The bushing is disposed in the rubber flange and includes a tubular body, a channel, and a lip. The tubular body is disposed in the opening of the rubber flange. The channel extends through a center of the body. The generally flat lip extends radially outward from the tubular body and is seated in the slot of the rubber flange. The lip is in contact and engages with the rubber flange so as to compress the rubber flange against the case. The retaining ring is in contact with the second major face of the rubber flange and includes a hole in alignment with the opening of the rubber flange and with the channel of the bushing. The fastener extends through the hole, through the channel, through the opening, and into engagement with a portion of the case. The fastener compresses the retaining ring against a portion of the rubber flange thereby compressing the rubber flange into the case such that an interface between the case and the first major face of the rubber flange forms a fluidic seal.

BRIEF DESCRIPTION OF THE DRAWINGS

FIG. 1 is a perspective view of an assembly with a boot, a conduit, and a case.

FIG. 2A is an exploded side cross-section view taken along 2-2 shown in FIG. 1 of a portion of the boot including a first bushing, a retaining ring, and a fastener.

FIG. 4A is a perspective view showing a top of a retaining ring with bushings.

FIG. 4B is a perspective view showing a bottom of the retaining ring with bushings.

FIG. 5A is an exploded perspective view of the boot and the retaining ring in an un-mounted state.

FIG. 5B is an assembled perspective view of the boot and the retaining ring in a mounted state.

FIG. 6A is a perspective view showing a bottom of a retaining ring mounted in a flange of a boot.

FIG. 6B is a perspective view showing a top of the retaining ring from FIG. 7A mounted in the flange of the boot.

DETAILED DESCRIPTION

Figure 2B:
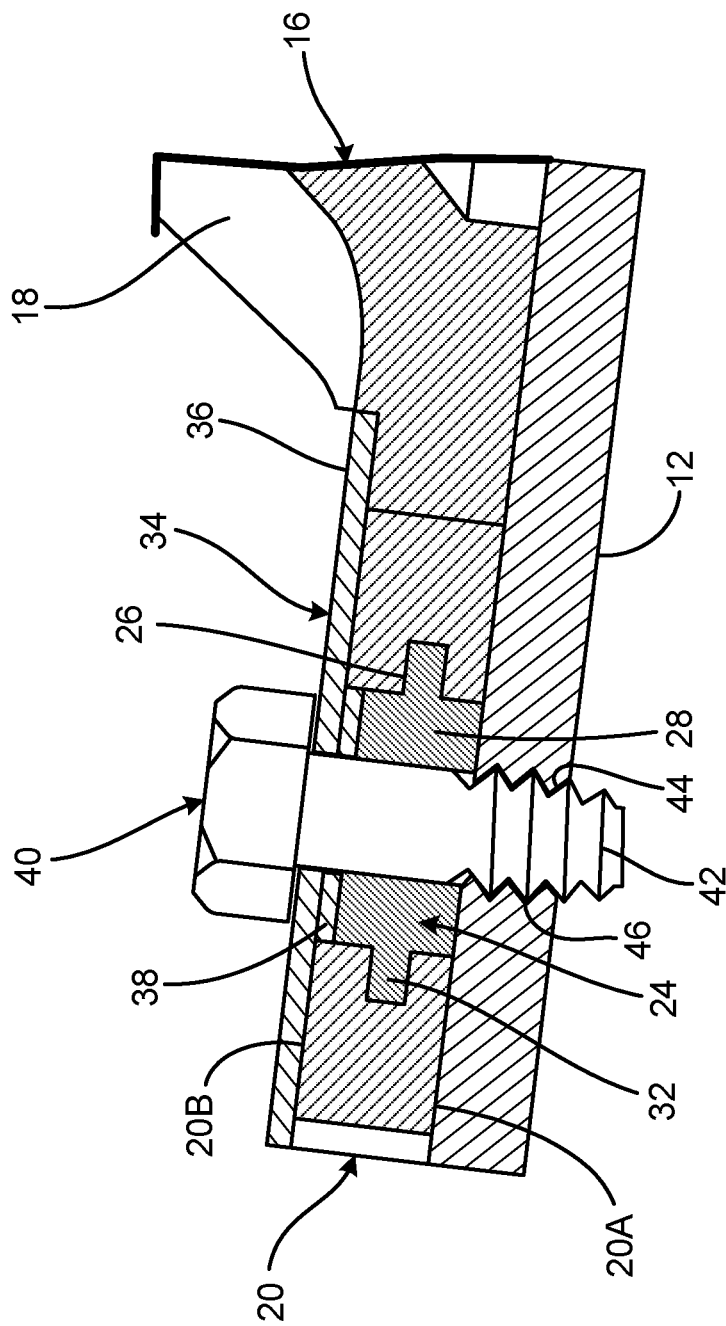
FIG. 2B is an assembled side cross-section view of the boot, the first bushing, the retaining ring, and the fastener.

FIG. 1 is a perspective view of assembly 10 showing case 12, conduit 14, boot 16 (with tube 18, flange 20, and openings 22), and bushing 24.

Assembly 10 includes case 12, conduit 14, boot 16, and bushing 24. Case 12 is a shell or wall of a fan case or other similar object in a jet turbine engine. Conduit 14 is a tube or pipe that houses electrical or fluid flow components. Boot 16 is a rubber sealing element that includes tube 18, flange 20, and openings 22. Tube 18 is a generally cylindrical piece of rubber tubing. Flange 20 is a circular, generally flat piece (or ring) of rubber. Openings 22 are passages or channels. In this example, there are four openings. In other examples there can be less than or more than four openings. Bushing 24 is a sleeve or cylindrical liner of solid material. In this example, there is one bushing 24. In other examples, there can be more than one bushing 24.

Assembly 10 is disposed in and is a part of an engine, such as a jet turbine engine. Conduit 14 is connected to case 12 at boot 16. Boot 16 is in contact with conduit 14 via tube 18 and with case 12 via flange 20. Tube 18 is connected to and extends axially from flange 20. Tube 18 is in contact with conduit 14. Flange 20 is connected to tube 18 and is in contact with case 12. Openings 22 are disposed in and pass through flange 20. Bushing 24 is disposed in one of openings 22. In this example, there is one bushing disposed in one of openings 22. In other examples, there can be more than one bushing, each disposed in other openings 22.

Assembly 10 provides a fluidic sealing interface between case 12 and conduit 14. Conduit 14 contains and protects electrical or fluid transfer components housed within conduit 14. Boot 16 seals the connection or interface between case 12 and conduit 14 by fitting tightly against and attaching to surfaces of both case 12 and conduit 14. Tube 18 is shaped so as to seat with (e.g., match) a shape of an outer surface of conduit 14. Flange 20 comes into contact and forms a seal with case 12. Flange 20 is integrally formed with tube 18 of boot 16. Openings 22 provide an opening through which a fastener is passed through in order to attach flange 20 to case 12. In this example, openings 22 provide receptacles into which bushing 24 (or multiple bushings 24) fits into.

As will be discussed in relation to the remaining figures, bushing 24 functions as a retention feature that provides structural support to flange 20 as a fastener is used to attach boot 16 to case 12. As the fastener tightens down onto flange 20 during attachment of boot 16 to case 12, bushing 24 takes on the compressive force applied by the fastener. Because bushing 24 is made of solid material, bushing 24 eliminates the rubber compressibility factor of flange 20 thereby preventing damage to boot 16 due to over-torqueing the fastener.

FIG. 2A is an exploded side cross-section view taken along 2-2 shown in FIG. 1 of boot 16 and shows tube 18, flange 20 (with first major face 20A, second major face 20B, opening 22, and slot 26) bushing 24 (with body 28, channel 30, and lip 32), retaining ring 34 (with body 36 and locating features 38), and fastener 40 (with threading 42). FIG. 2B is an assembled side cross-section view of case 12 and boot 16 showing tube 18, flange 20 (with first major face 20A, second major face 20B, opening 22, and slot 26) bushing 24 (with body 28, channel 30, and lip 32), retaining ring 34 (with body 36 and locating features 38), and fastener 40 (with threading 42) attached to case 12 (with hole 44 and threading 46). For ease of discussion FIGS. 2A and 2B will be discussed in tandem.

First major face 20A and second major face 20B are large, opposite surfaces of flange 20. Slot 26 is a ring-shaped aperture or opening. Body 28 is a tube of solid material. Channel 30 is a cylindrically shaped passage or opening. Lip 32 is a flat ring of solid material. Retaining ring 34 includes body 36 and locating features 38. Body 36 is a flat ring or washer of solid material. Locating features 38 are rings of solid material. Fastener 40 is a mechanical attachment device. In this example, fastener 40 is a screw or bolt. In other examples, fastener can be a non-threaded fastener such as a rivet. Threading 42 is a helical ridge connecting to and extending radially outward from fastener 40. Hole 44 is an opening or receptacle disposed in case 12. Threading 46 is a helical ridge connecting to and extending radially inward from hole 44.

First major face 20A and second major face 20B are positioned on opposite sides of flange 20 from each other. When assembly 10 is assembled, as shown in FIG. 2B, second major face 20B of flange 20 is in contact with retaining ring 34. Bushing 24 is shown as embedded into flange 20 of boot 16. Bushing 24 is embedded into flange 20 of boot 16 during an injection molding process used to create boot 16. Slot 26 is disposed in a portion of flange 20. Slot 26 is connected to and extends radially outward from channel 30. Body 28 of bushing 24 is mounted in opening 22 of flange 20. Here, body 28 is shown as in contact with a radially inner wall of opening 22. Channel 30 passes through a radial center of body 28. Lip 32 is connected to and extends radially outward from body 28. In this example, lip 32 is positioned in slot 26 of flange 20. In this exploded view, retaining ring 34 is shown as disengaged with flange 20. During operation, retaining ring 34 is brought into contact with second major face 20B of flange 20, as is shown in FIG. 2B.

Locating features 38 are connected to and extend from body 36. In this example, locating features 38 are attached to body 36 via bonding. In the exploded view shown in FIG. 2A, fastener 40 is shown as separated from retaining ring 34. When assembled, as shown in FIG. 2B, a portion of fastener 40 is brought into contact with body 36 of retaining ring 34. Threading 42 on a distal end of fastener 40 threadably engages with threading 46 in hole 44 of case 12 in order to attach boot 16 to case 12.

Bushings 24 are mounted into flange 20 of boot 16 during an injection molding process used to form boot 16. For example, during setup of a mold cavity used during the injection molding process for boot 16, bushing (or bushings) 24 are placed within the mold cavity. The mold cavity is then closed with bushings 24 inside of the closed mold cavity. The mold cavity is then injected with the rubber material to form boot 16. Once the rubber material is cooled and fully set, the mold cavity is opened and removed from the formed part of boot 16. The resulting part is boot 16 with bushings 24 positioned inside of flange 20.

Slot 26 in flange 20 provides a receptacle or holder in which lip 32 of bushing 24 is held or retained. Additionally, slot 26 provides a region of flange 20 onto which lip 32 presses against to compress flange 20 into case 12 in order to create a fluidic seal between flange 20 and case 12. Body 28 of bushing 24 provides a stop that retaining ring 34 comes into contact with as retaining ring 34 clamps down onto flange 20 of boot 16. For example, as fastener 40 is used to attach boot 16 to case 12, retaining ring 34 is brought into contact with and driven into flange 20 of boot 16. As retaining ring 34 is driven into flange 20, flange 20 compresses and a thickness of flange 20 reduces, as is shown in FIG. 2B. With bushing 24 being mounted in opening 22, locating features 38 of retaining ring 34 come into contact with body 28 of bushing 24, at which point body 28 prevents retaining ring 34 from further compressing flange 20.

Channel 30 provides a thru-bore through which fastener 40 passes in order to engage with case 12. In this non-limiting embodiment, fastener 40 is threadably engaged with case 12 by way of threading 42 of fastener 40 interlocking with threading 46 of hole 44. Lip 32 locates bushing 24 in a specific position within opening 22 of flange 20. For example, lip 32 sits in slot 26 preventing axial movement of bushing 24 along opening 22. Lip 32 also presses down onto a portion of flange 20 as retaining ring 34 is driven down into flange 20 by fastener 40 during the assembly of assembly 10. In this way, lip 32 presses flange 20 of boot 16 against case 12 to form a sealing interface between first major face 20A of flange 20 and a surface of case 12, as is shown in FIG. 2B. Retaining ring 34 provides a uniform clamping or compressive pressure onto flange 20 so as to provide a uniform sealing interface along the entire circumference of first major face 20A of flange 20. As retaining ring 34 is driven down into flange 20, body 36 presses into second major face 20B of flange 20 providing the compressive force onto flange 20.

Locating features 38 are used to correctly position retaining ring 34 relative to openings 22 of flange 20. In this example, one of locating features 38 comes into contact with body 28 of bushing 24 during assembly of assembly 10. In other non-limiting embodiments, retaining ring 34 does not include locating features 38 and instead includes holes through which fastener(s) 40 pass through to engage with case 12. In these examples, body 36 of retaining ring 34 is brought into contact with body (or bodies) 36 of bushings 24 as retaining ring 34 is driven down into flange 20. Fastener 40 attaches boot 16 to case 12 via attachable engagement with case 12. For example, fastener 40 extends through channel 30, through opening 22, and into engagement with hole 44 of case 12 so as to apply a force to bushing 24 thereby compressing flange 20 with lip 32 of bushing 24. In this example, fastener 40 works to compress retaining ring 34 down and into flange 20 of boot 16.

In one example, a method of attaching boot 16 to case 12 includes positioning retaining ring 34 between a first portion of fastener 40 and flange 20. Fastener 40 is passed through locating feature 38, through opening 22, and through channel 30. Fastener 40 is attachably engaged with case 12 by way of threading 42 of fattener 40 threadably engaging with threading 46 of hole 44 of case 12. A compressive force is applied to flange 20 with fastener 40. Applying the compressive force to flange 20 can include bringing fastener 40 into contact with retaining ring 34, retaining ring 34 can be pressed into flange 20, and flange 20 can be compressed with retaining ring 34 into the surface of case 12. In another example, flange 20 of boot 16 is pressed against case 12 with lip 32 of bushing 24. A sealing interface is formed between first major face 20A of flange 20 and a surface of case 12. In one example, the compression of flange 20 with body 28 of bushing 24 can be stopped by contacting body 28 of bushing 24 with a portion of retaining ring 34. In another example, the compression of flange 20 with body 28 of bushing 24 can be stopped by contacting body 28 of bushing 24 with a portion of case 12.

In existing configurations for rubber boots of this type without bushing 24, an adhesively bonded metal retainer ring is attached to the boot to provide a flat hard surface for the bolt and nut faces of the fastener to be seated on. Embedding bushing 24 into flange 20 eliminates the bonding step required in existing configurations and the possibility of separation is reduced because boot 16 and bushing 24 are molded together rather than being glued together.

Additionally, with existing designs not including embedded bushings, there are large amounts of time spent between applying torque and waiting for the rubber of the flange to set. Multiple iterations of these steps are necessary to ensure that the rubber is not damaged and that the sealing interface between the flange and the case forms properly. The use of bushing 24 allows for a one-time torque process to compress flange 20 of boot 16 and to achieve the required setting of the sealing interface between flange 20 and case 12. Boot 16 with embedded bushing 24 eliminates the need for special torque values to account for damage to flange 20, reduces risk of rubber material failure, and reduces procedures in the manufacturing process by eliminating the need to adhesively bond retaining ring 34 to flange 20.

Figure 3A:
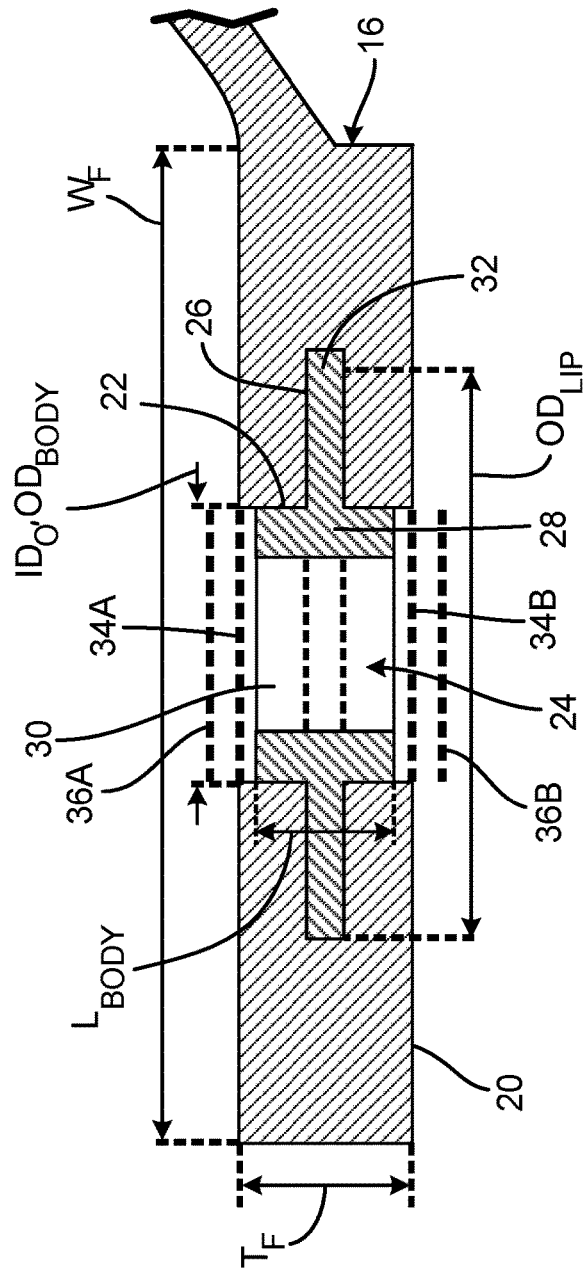
FIG. 3A is a side cross-section view of the first bushing mounted into the flange of the boot.

FIG. 3A is a side-cross section view of boot 16 and bushing 24 and shows flange 20 (with first major face 20A, second major face 20B, opening 22 and slot 26) and bushing 24 (with body 28, channel 30, and lip 32). FIG. 3A also shows thickness $T_F$ of flange 20, width $W_F$ of flange 20, inner diameter $ID_O$ of opening 22, length $L_{BODY}$ of body 28, outer diameter $OD_{BODY}$ of body 28, outer diameter $OD_{LIP}$ of lip 32, first alternate ends 34A and 34B of body 28, and second alternate ends 36A and 36B of body 28.

Thickness $T_F$ is a thickness of flange 20 measured from first major face 20A and second major face 20B of flange 20 (vertically as shown in FIG. 3A). In this example, thickness $T_F$ of flange 20 is shown in an uncompressed state. Width $W_F$ is a width of flange 20 measured horizontally as shown in FIG. 3A. Inner diameter $ID_O$ is an inner diameter of opening 22. Length $L_{BODY}$ is a length of body 28 measured vertically as shown in FIG. 3A. Outer diameter $OD_{BODY}$ is an outer diameter of body 28. Outer diameter $OD_{LIP}$ is an outer diameter of lip 32. First alternate ends 34A and 34B are exemplary, opposite distal ends of body 28. First alternate ends 34A and 34B of body 28 are depicted by dotted lines as shown in FIG. 3A. Second alternate ends 36A and 36B of body 28 are additional exemplary, opposite ends of body 28. Second alternate ends 36A and 36B of body 28 are depicted by dotted lines as shown in FIG. 3A.

In FIG. 3A, lip 32 is shown disposed in flange 20 approximately at a mid-point of thickness $T_F$ of flange 20. In other non-limiting embodiment, lip 32 can be positioned closer to either of first or second major faces 20A or 20B to provide varying amounts of compressive force onto flange 20. In this example, thickness $T_F$ of flange 20 is greater than length $L_{BODY}$ of body 28. In this example, width $W_F$ of flange 20 is greater than outer diameter $OD_{LIP}$ of lip 32. Inner diameter $ID_O$ of opening 22 is shown as being approximately half of a size of outer diameter $OD_{LIP}$ of lip 32. Length $L_{BODY}$ of body 28 is shown as being less than thickness $T_F$ of flange 20. Outer diameter $OD_{BODY}$ of body 28 is approximately equal to inner diameter $ID_O$ of opening 22 and is approximately half the size of outer diameter $OD_{LIP}$ of lip 32 in this example. Outer diameter $OD_{LIP}$ of lip 32 is shown as being approximately twice as large as outer diameter $OD_{BODY}$ of body 28 and twice as large as inner diameter $ID_O$ of opening 22. In this example, outer diameter $OD_{LIP}$ of lip 32 is less than width $W_F$ of flange 20.

First alternate ends 34A and 34B of body 28 depict an example wherein length $L_{BODY}$ of body 28 is equal to thickness $T_F$ of flange 20. Second alternate ends 36A and 36B of body 28 depict an example wherein length $L_{BODY}$ of body 28 is greater than thickness $T_F$ of flange 20.

With outer diameter $OD_{LIP}$ of lip 32 being approximately twice as large as inner diameter $ID_O$ of opening 22, lip 32 includes a significant amount of surface area with which lip 32 presses down and into flange 20 in order to compress flange 20 into case. As mentioned with respect to the FIG. 2A, body 28 acts as a stop against which retaining ring 34 comes into abutment with thereby stopping or preventing retaining ring 34 from further compressing flange 20 to a thickness less than length $L_{BODY}$ of body 28. In the example of first alternate ends 34A and 34B, body 28 would allow retaining ring 34 to come into contact with flange 20 but would stop retaining ring 34 from compressing flange 20 due to length $L_{BODY}$ of body 28 being equal to thickness $T_F$ of flange 20. In the example of second alternate ends 36A and 36B, body 28 would prevent retaining ring 34 from coming into contact with flange 20 and would prevent retaining ring 34 from compressing flange 20 due to length $L_{BODY}$ of body 28 being greater than thickness $T_F$ of flange 20.

With length $L_{BODY}$ of body 28 bring smaller, larger, or equal to thickness $T_F$ of flange 20, varying fits and different engine configurations can be accommodated.

Figure 3B:
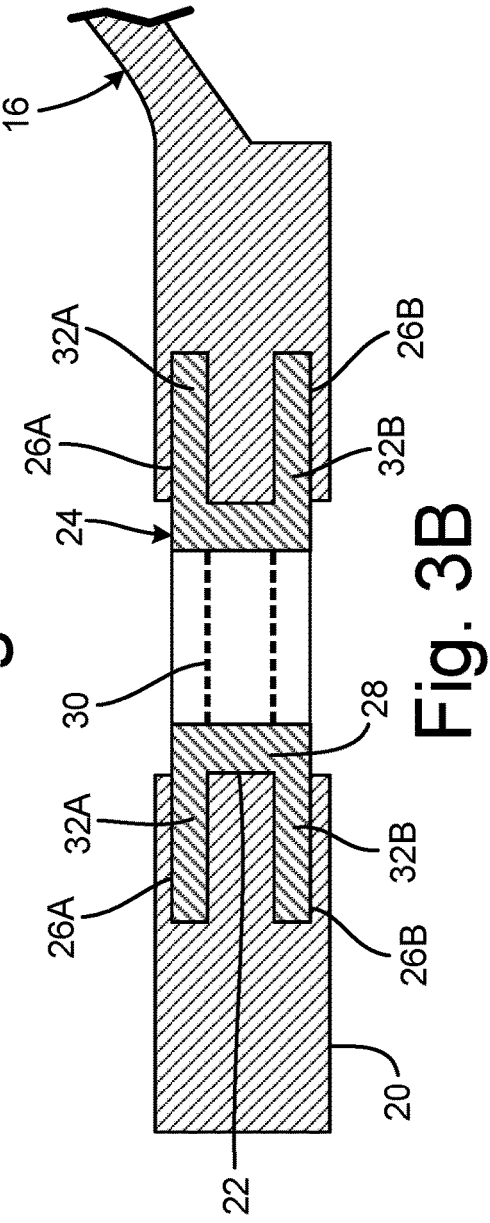
FIG. 3B is a side cross-section view of a second bushing mounted into the flange of the boot.

FIG. 3B is a side-cross section view of boot 16 and bushing 24 and shows flange 20 (with first major face 20A, second major face 20B, opening 22, first slot 26A, and second slot 26B) and bushing 24 (with body 28, channel 30, first lip 32A, and second lip 32B). First slot 26A and second slot 26B are ring-shaped apertures or openings. First lip 32A and second lip 32B are flat rings of solid material.

First slot 26A and second slot 26B are connected to and extend radially outward from opening 22. First slot 26A and second slot 26B are disposed in portions of flange 20. First lip 32A and second lip 32B are connected to and extend radially outward from body 28. First lip 32A and second lip 32B are retained in first slot 26A and second slot 26B, respectively so as to provide a compressive force onto portions of flange 20. The compressive force applied to flange 20 by first lip 32A and second lip 32B presses flange 20 down and into case 12 (see e.g., FIG. 1) to form a sealing interface between flange 20 of boot 16 and case 12. The difference between the embodiment shown in FIG. 3A with single lip 32 and the embodiment shown here in FIG. 3B is that the compressive force applied to flange 20 is divided across both of slots 26A and 26B as applied by first and second lips 32A and 32B. This division of the applied compressive force further prevents portions of flange 20 from becoming compressed too much such that damage is caused to flange 20.

Similar to the benefits from the examples shown in FIG. 3A, flange 20 with first slot 26A and second slot 26B and bushing 24 with first lip 32A and second lip 32B provide for varying fits and different engine configurations to be accommodated. FIGS. 2-3B included embodiments with bushings 24 being a separate component from retaining ring 34. In FIGS. 4A-5B, a second embodiment is discussed showing the bushings being formed and/or connected to the retaining ring with the retaining ring being placed onto a top surface of the flange.

FIG. 4A is a perspective view showing a top of retaining ring 134 and shows bushings 124, bodies 128, channels 130, and lip 132. FIG. 4B is a perspective view showing a bottom of retaining ring 134 and shows bushings 124, bodies 128, channels 130, and lip 132. FIGS. 4A and 4B will be discussed in unison. Bushings 124 are sleeves or cylindrical liners of solid material. In this example, there are four bushings 124. In other examples, there can be more or less than four bushings 124. Bodies 128 are tubes of solid material. Channels 130 are cylindrically shaped passages or openings. Lip 132 is a flat ring of solid material. Retaining ring 134 includes bushings 124, bodies 128, channels 130, and lip 132.

Bodies 128 of bushings 124 are attached to lip 132 via mechanical or bonded attachment. Channels 130 are disposed through bodies 128 and through portions of lip 132. The non-limiting embodiments shown in FIGS. 1-3B show bushings 24 each with their own respective lip 32. Here, the non-limiting embodiment shown in FIGS. 4A and 4B show each of the four bushings 124 as being connected via a single, continuous lip 132 that forms retaining ring 134. In this way, a single lip 132 with bushings 124 forms retaining ring 134. Lip 132 functions similar to lip 32 discussed with respect to FIGS. 2-3B. In this embodiment, bushings 124 function as mechanical stops preventing flange 20 from compressing too much. In comparison, FIGS. 1-3 showed bushing 24 as being a separate component from retaining ring 34. Here, retaining ring 134 with integrally formed bushings 124 provides the improvement of a single piece being used to provide the stopping functionality of bushings 124 as well as the downward pressure applied by lip 132 onto an entire circumference of flange 20.

FIG. 5A is an exploded perspective view of boot 116 and retaining ring 134 in an un-mounted state and shows boot 116 (with tube 118, flange 120, and openings 122) and retaining ring 134 (with bushings 124, bodies 128, channels 130, and lip 132).

Here, retaining ring 134 is separated from boot 116 and such that bushings 124 are aligned with openings 122 of flange 120. In this embodiment, bodies 128 are sized and aligned so as to fit into openings 122 of flange 120. The dotted arrowheads in FIG. 5A depict the path bushings 124 take in order to reach the assembled state shown in FIG. 5B. In this way, bushings 124 of retaining ring 134 also function as locating features that ensure that retaining ring 134 is properly seated/mated with flange 120 of boot 116 upon bringing retaining ring 134 into contact with flange 120.

FIG. 5B is an assembled perspective view of boot 116 and retaining ring 134 of FIG. 5A. Here, retaining ring 134 has been brought into contact with flange 120 of boot 116. In this assembled configuration, bodies 128 of bushings 124 provide the mechanical stopping feature as previously discussed in order to prevent flange 120 of boot 116 from becoming compressed too much thereby preventing compression-induced damage to boot 116. When used in combination with a fastener (such as fastener 40 shown in FIG. 2A), lip 132 of retaining ring 134 can be positioned between a first portion of the fastener and flange 120 of boot 116. The compression of flange 122 is stopped with bodies 128 of retaining ring 134 by contacting bodies 128 with a portion of the case (such as case 12 shown in FIG. 1).

FIGS. 4A-5B presented a second embodiment with retaining ring 134 formed with bushings 124 and such that retaining ring 134 is positioned on the top surface of flange 120. FIGS. 6A-6B present a third embodiment showing a retaining ring with the same or similar configuration as retaining ring 134, but that the retaining ring in FIGS. 6A-6B is embedded into the flange of the boot similar to how lip 32 of bushing 24 is embedded into flange 20 as shown in FIGS. 2A-3A.

FIG. 6A is a perspective view showing a bottom of retaining ring 234 mounted in boot 216 and shows boot 216 (with tube 218, flange 220, openings 222, and slot 226) and retaining ring 234 (with bushings 224, bodies 228, channels 230, and lip 232). FIG. 6B is a perspective view showing a top of retaining ring 234 mounted in boot 216 and shows boot 216 (with tube 218, flange 220, openings 222, and slot 226) and retaining ring 234 (with bushings 224, bodies 228, channels 130, and lip 232). FIGS. 6A and 6B will be discussed in unison.

In the previously discussed example of retaining ring 134, bodies 128 extended outward from one side of lip 132. In this example, bodies 228 of retaining ring 234 can extend from one or both sides of lip 232 at similar or varying distances from lip 232. Additionally, retaining ring 234 includes a same or similar configuration as retaining ring 134 as shown in FIGS. 5A-5B. In this embodiment shown in FIGS. 6A-6B, retaining ring 234 is oriented upside down as from the orientation of retaining ring 134 shown in FIGS. 5A-5B. For example, retaining ring 134 can be flipped vertically to achieve the configuration of retaining ring 234 as shown in FIGS. 6A-6B.

Here, in comparison to previously discussed slot 26, slot 226 is disposed in a radially outer portion of flange 220. Slot 226 extends for an entire circumference (or a full 360°) of flange 220 in comparison to slot 26 discussed with reference to FIG. 2A, which includes a localized slot surrounding one of openings 22 in flange 20. In this example, slot 226 and therefore lip 232 of retaining ring 234 is slightly offset from a mid-point of flange 220. In other non-limiting embodiments, slot 226 can be positioned at different positions in flange 220 such as at a mid-point along a thickness of flange 220. In this example, a single lip 232 is shown as being formed with retaining ring 234. In other non-limiting embodiments, more than one lip 232 can be incorporated into retaining ring 234, similar to the pair of lips 32A and 32B shown in FIG. 3B.

Here, a force is applied to bushings 224 with the fastener (for example fastener 40) thereby compressing flange 220 with lip 232 of retaining ring 234. Retaining ring 234 is positioned in slot 226 such that lip 232 of retaining ring 234 also extends for the entire circumference (or the full 360°) of flange 220. Having retaining ring 234 disposed in a portion of flange 220, in comparison to having retaining ring 134 come into contact with an outer face of flange 120 shown in FIG. 5B, provides for varying the amount of compressive force applied to portions of flange 220 as a result of fastening boot 216 to case 12.

Discussion of Possible Embodiments

The following are non-exclusive descriptions of possible embodiments of the present invention.

An assembly for sealing an interface between a conduit and a case includes a boot and a bushing. The boot includes a tube and rubber flange. The rubber flange extends generally radially outward from the first end of the tube. The rubber flange includes an opening passing through a portion of the rubber flange. A thickness of the rubber flange is measured from a first major face of the flange to a second major face of the flange. The bushing is disposed in the rubber flange and includes a tubular body, a channel, and a lip. The tubular body is disposed in the opening of the rubber flange. The channel extends through a center of the body. The lip is generally flat and extends radially outward from the tubular body. The lip is in contact and engages with the rubber flange so as to compress the rubber flange against the case.

The assembly of the preceding paragraph can optionally include, additionally and/or alternatively, any one or more of the following features, configurations and/or additional components.

The lip can form a retaining ring that can extend a circumference of the rubber flange of the boot.

A slot can be disposed in a portion of the rubber flange, and/or a fastener can extend through the hole, through the channel, through the opening, and/or into engagement with a portion of the case so as to apply a force to the bushing thereby compressing the rubber flange with the lip of the bushing, wherein the lip can be seated in the slot.

The slot can extend the circumference of the rubber flange of the boot.

A length of the body of the bushing can be less than or greater than the thickness of the rubber flange of the boot.

The rubber flange can include first and/or second ring shaped slots connected to and extending around a portion of the opening, and/or the bushing can include first and second lips that are axially spaced from each other, wherein the first and second lips can engage with the first and second slots, respectively.

A retaining ring can be in contact with the second major face of the rubber flange, wherein the retaining ring can comprise a hole in alignment with the opening of the rubber flange and with the channel of the bushing, and/or a fastener can extend through the hole, through the channel, and/or through the opening and/or into engagement with a portion of the case so as to apply a force to the retaining ring thereby compressing the rubber flange with the retaining ring.

An outer diameter of the lip of the bushing can be approximately twice the size of an outer diameter of the body of the bushing.

A method of attaching a boot to a case includes passing a fastener through a portion of a boot assembly. The boot assembly includes a boot and a bushing. The boot includes a tube and a rubber flange. The rubber flange extends generally radially outward from the first end of the tube and includes an opening and a ring-shaped slot. A thickness of the rubber flange is measured from a top portion of the rubber flange to a bottom portion of the rubber flange. The opening passes through a portion of the rubber flange that the fastener passes through. The ring-shaped slot is connected to and extends around a portion of the opening. The bushing is disposed in the rubber flange and includes a tubular body, a channel, and a lip. The tubular body is disposed in the opening of the rubber flange. The channel extends through a center of the body that the fastener is passed through. The lip is generally flat and extends radially outward from the tubular body. The lip is in contact with a portion of the rubber flange of the boot. The fastener is attachably engaged with the case. A compressive force is applied to the rubber flange with the fastener. The rubber flange of the boot is pressed against the case with the lip of the bushing. A sealing interface is formed between a first major face of the rubber flange and a surface of the case.

The method of the preceding paragraph can optionally include, additionally and/or alternatively, any one or more of the following steps, features, configurations and/or additional components.

A retaining ring can be positioned between a first portion of the fastener and the rubber flange, and/or applying a compressive force to the rubber flange can comprise bringing the first portion of the fastener into contact with the retaining ring, pressing the retaining ring into the rubber flange, and/or compressing the rubber flange, with the retaining ring, into the surface of the case.

The compression of the rubber flange can be stopped with the body of the bushing by contacting the body of the bushing with a portion of the retaining ring.

The compression of the rubber flange can be stopped with the body of the bushing by contacting the body of the bushing with a portion of the case.

The lip of the bushing can be positioned between a first portion of the fastener and the rubber flange, and/or the compression of the rubber flange can be stopped with the body of the bushing by contacting the body of the bushing with a portion of the case.

A slot can be disposed in a portion of the rubber flange, wherein the slot can extend the circumference of the rubber flange of the boot, wherein the lip can be seated in the slot, wherein the lip can form a retaining ring that extends a circumference of the rubber flange of the boot, and/or a force can be applied to the bushing with the fastener thereby compressing the rubber flange with the lip.

An assembly for sealing an interface between a conduit and a case in an aircraft includes a boot, a bushing, a retaining ring, and a fastener. The boot includes a tube, a rubber flange with first and second major faces, and a slot. The conduit passes through a portion of the tube and a fluidic seal is formed between the conduit and the tube of the boot. The rubber flange extends generally radially outward from the first end of the tube and includes an opening passing through a portion of the rubber flange. The slot is disposed in a portion of the rubber flange. The bushing is disposed in the rubber flange and includes a tubular body, a channel, and a lip. The tubular body is disposed in the opening of the rubber flange. The channel extends through a center of the body. The generally flat lip extends radially outward from the tubular body and is seated in the slot of the rubber flange. The lip is in contact and engages with the rubber flange so as to compress the rubber flange against the case. The retaining ring is in contact with the second major face of the rubber flange and includes a hole in alignment with the opening of the rubber flange and with the channel of the bushing. The fastener extends through the hole, through the channel, through the opening, and into engagement with a portion of the case. The fastener compresses the retaining ring against a portion of the rubber flange thereby compressing the rubber flange into the case such that an interface between the case and the first major face of the rubber flange forms a fluidic seal.

The assembly of the preceding paragraph can optionally include, additionally and/or alternatively, any one or more of the following features, configurations and/or additional components.

A compressive force can be applied to the bushing with the fastener thereby compressing, with the lip of the bushing, the rubber flange into the case.

A thickness of the rubber flange can be measured from the first major face of the flange to the second major face of the flange, and/or wherein a length of the body of the bushing can be less than the thickness of the rubber flange of the boot.

An outer diameter of the lip of the bushing can be approximately twice the size of an outer diameter of the body of the bushing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for sealing an interface between a conduit and a case in an aircraft, the assembly comprising:
   a boot comprising:
      a tube with first and second ends;
      a rubber flange extending generally radially outward from the first end of the tube, wherein the rubber flange comprises an opening passing through a portion of the rubber flange, wherein the rubber flange comprises a first major face and a second major face; and
      a slot disposed in a portion of the rubber flange;
   a bushing disposed in the rubber flange, the bushing comprising:
      a tubular body disposed in the opening of the rubber flange;
      a channel extending through a center of the tubular body; and
      a lip extending radially outward from the tubular body, wherein the lip is generally flat, wherein the lip is in contact and engages with the rubber flange so as to compress the rubber flange against the case; and
   a fastener extending through the channel, through the opening, and into engagement with a portion of the case so as to apply a force to the bushing thereby compressing the rubber flange with the lip of the bushing, wherein the lip is seated in the slot.

2. The assembly of claim 1, wherein the lip forms a retaining ring that extends along a circumference of the rubber flange of the boot.

3. The assembly of claim 1, wherein the slot extends along a circumference of the rubber flange of the boot.

4. The assembly of claim 1, wherein a thickness of the rubber flange is measured from the first major face of the flange to the second major face of the flange, and wherein a length of the body of the bushing is less than or greater than the thickness of the rubber flange of the boot.

5. The assembly of claim 1, further comprising:
   wherein the rubber flange includes first and second ring shaped slots connected to and extending around a portion of the opening; and
   wherein the bushing includes first and second lips that are axially spaced from each other, wherein the first and second lips engage with the first and second slots, respectively.

6. The assembly of claim 1, further comprising:
   a retaining ring in contact with the second major face of the rubber flange, wherein the retaining ring comprises a hole in alignment with the opening of the rubber flange and with the channel of the bushing; and
   a fastener extending through the hole, through the channel, through the opening, and into engagement with a portion of the case so as to apply a force to the retaining ring thereby compressing the rubber flange with the retaining ring.

7. The assembly of claim 1, wherein an outer diameter of the lip of the bushing is approximately twice the size of an outer diameter of the body of the bushing.

8. A method of attaching a boot to a case, the method comprising:
   passing a fastener through a portion of a boot assembly, wherein the boot assembly comprises:
      the boot comprising:
         a tube with first and second ends; and
         a rubber flange extending generally radially outward from the first end of the tube, wherein the rubber flange comprises:
            an opening passing through a portion of the rubber flange, wherein the fastener passes through the opening; and
            a ring-shaped slot connected to and extending around a portion of the opening, wherein a thickness of the rubber flange is measured from a top portion of the rubber flange to a bottom portion of the rubber flange; and
      a bushing disposed in the rubber flange, the bushing comprising:
         a tubular body disposed in the opening of the rubber flange;
         a channel extending through a center of the tubular body, wherein the fastener is passed through the channel of the bushing; and
         a lip extending radially outward from the tubular body, wherein the lip is generally flat, wherein the lip is in contact with a portion of the rubber flange of the boot;
   attachably engaging the fastener with the case;
   applying a compressive force to the rubber flange;
   pressing, with the lip of the bushing, the rubber flange of the boot against the case; and
   forming a sealing interface between a first major face of the rubber flange and a surface of the case.

9. The method of claim 8, further comprising:
positioning a retaining ring between a first portion of the fastener and the rubber flange; and
wherein applying a compressive force to the rubber flange comprises:
bringing the first portion of the fastener into contact with the retaining ring;
pressing the retaining ring into the rubber flange; and
compressing the rubber flange, with the retaining ring, into the surface of the case.

10. The method of claim 9, further comprising stopping the compression of the rubber flange with the body of the bushing by contacting the body of the bushing with a portion of the retaining ring.

11. The method of claim 9, further comprising stopping the compression of the rubber flange with the body of the bushing by contacting the body of the bushing with a portion of the case.

12. The method of claim 8, wherein the lip of the bushing is positioned between a first portion of the fastener and the rubber flange; and further comprising stopping the compression of the rubber flange with the body of the bushing by contacting the body of the bushing with a portion of the case.

13. The method of claim 8, further comprising:
a slot disposed in a portion of the rubber flange, wherein the slot extends along a circumference of the rubber flange of the boot, wherein the lip is seated in the slot, wherein the lip forms a retaining ring that extends along the circumference of the rubber flange of the boot; and
applying, with the fastener, a force to the bushing thereby compressing the rubber flange with the lip.

14. An assembly for sealing an interface between a conduit and a case in an aircraft, the assembly comprising:
a boot comprising:
a tube with first and second ends, wherein the conduit passes through a portion of the tube, wherein a fluidic seal is formed between the conduit and the tube of the boot; and
a rubber flange extending generally radially outward from the first end of the tube, wherein the rubber flange comprises an opening passing through a portion of the rubber flange, wherein the rubber flange comprises a first major face and a second major face;
a slot disposed in a portion of the rubber flange; and
a bushing disposed in the rubber flange, the bushing comprising:
a tubular body disposed in the opening of the rubber flange;
a channel extending through a center of the tubular body; and
a lip extending radially outward from the tubular body, wherein the lip is generally flat, wherein the lip is seated in the slot of the rubber flange, wherein the lip is in contact and engages with the rubber flange so as to compress the rubber flange against the case;
a retaining ring in contact with the second major face of the rubber flange, wherein the retaining ring comprises a hole in alignment with the opening of the rubber flange and with the channel of the bushing; and
a fastener extending through the hole, through the channel, through the opening, and into engagement with the case, so that the fastener compresses the retaining ring against a portion of the rubber flange thereby compressing the rubber flange into the case, wherein an interface between the case and the first major face of the rubber flange forms a fluidic seal.

15. The assembly of claim 14, wherein the fastener applies a compressive force to the bushing thereby compressing, with the lip of the bushing, the rubber flange into the case.

16. The assembly of claim 14, wherein a thickness of the rubber flange is measured from the first major face of the flange to the second major face of the flange, and wherein a length of the body of the bushing is less than the thickness of the rubber flange of the boot.

17. The assembly of claim 14, wherein an outer diameter of the lip of the bushing is approximately twice the size of an outer diameter of the body of the bushing.

* * * * *